US009444619B2

(12) United States Patent
Gauravaram

(10) Patent No.: US 9,444,619 B2
(45) Date of Patent: Sep. 13, 2016

(54) GENERATION OF RANDOMIZED MESSAGES FOR CRYPTOGRAPHIC HASH FUNCTIONS

(71) Applicant: Tata Consultancy Services Limited, Mumbai (IN)

(72) Inventor: Praveen Gauravaram, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 104 days.

(21) Appl. No.: 14/085,249

(22) Filed: Nov. 20, 2013

(65) Prior Publication Data
US 2014/0298038 A1 Oct. 2, 2014

(30) Foreign Application Priority Data
Mar. 26, 2013 (IN) .......................... 1164/MUM/2013

(51) Int. Cl.
G06F 11/30 (2006.01)
H04L 9/06 (2006.01)
H04L 9/08 (2006.01)

(52) U.S. Cl.
CPC .......... *H04L 9/0643* (2013.01); *H04L 9/0869* (2013.01)

(58) Field of Classification Search
CPC .... G06F 21/71; H04L 9/0643; H04L 9/0869
USPC ................................... 713/189, 181; 380/46
See application file for complete search history.

(56) References Cited

U.S. PATENT DOCUMENTS

| 6,011,846 A * | 1/2000 | Rabipour et al. ........ 379/406.06 |
| 6,370,247 B1 * | 4/2002 | Takaragi et al. ................. 380/28 |
| 2004/0252836 A1 * | 12/2004 | Yoshida et al. ............... 380/268 |

FOREIGN PATENT DOCUMENTS

WO WO-2011/039765 A2 4/2011

OTHER PUBLICATIONS

Praveen Gauravaram, "On Randomizing Hash Functions to Strenghen the security of Digital Signatures" 2009, Denmark.*
"Federal Information Processing Standards Publication 180-4", Secure Hash Standard (SHS), U.S. Department of Commerce, Information Technology Laboratory, National Institute of Standards and Technology, Gaithersburg, MD 20899-8900, (Mar. 2012), 35 pgs.
"Federal Information Processing Standards Publication 186-3", Digital Signature Standard (DSS), U.S. Department of Commerce, Information Technology Laboratory, National Institute of Standards and Technology, Gaithersburg, MD 20899-8900, (Jun. 2009), 130 pgs.
Barker, Elaine, "Recommendation for Random No. Generation Using Deterministic Random Bit Generators", NIST Special Publication 800-90A, Computer Security Division, Information Technology Laboratory, U.S. Department of Commerce, (Jan. 2012), 136 pgs.

(Continued)

Primary Examiner — Samson Lemma
(74) Attorney, Agent, or Firm — Schwegman Lundberg & Woessner, P.A.

(57) ABSTRACT

Method(s) and system(s) for generation of randomized messages for cryptographic hash functions are described herein. The method includes obtaining a random value based on a randomization criterion to randomize a message. Further, a last data block of the message is populated with a randomization parameter to obtain a randomized message. The randomization parameter populated in the last block is computed using the random value.

10 Claims, 2 Drawing Sheets

(56) References Cited

OTHER PUBLICATIONS

Damgard, Ivan, "A Design Principle for Hash Functions", In Advances in Cryptology—CRYPTO 1989, G. Brassard, Lecture Notces in Computer Science, vol. 435, Springer, (1990), 416-427.

Dang, Quynh, "Randomized Hashing for Digital Signatures", NIST Special Publication 800-106, Computer Security Division, Information Technology Laboratory, U.S. Department of Commerce, (Feb. 2009), 17 pgs.

Gauravaram, Praveen, et al., "On Randomizing Hash Functions to Strengthen the Security of Digital Signatures", In Advances in Cryptology—EUROCRYPT 2009, LNCS 5479, A. Joux, Ed. Lecture Notes in Computer Science, vol. 5479. Springer, (2009), 88-105.

Gauravaram, Praveen, et al., "Security Analysis of Randomize-Hash-then-Sign Digital Signatures", Journal of Cryptology 25(4), (Oct. 12, 2011), 748-779.

Halevi, Shai, et al., "Implementing the Halevi-Krawczyk Randomized Hashing Scheme", (Nov. 19, 2013), 15 pgs.

Halevi, Shai, et al., "Strengthening Digital Signatures via Randomized Hashing", In Advances in Cryptology—CRYPTO 2006, C. Dwork, Ed. Lecture Notes in Computer Science, vol. 4117. Springer, (Jan. 30, 2007), 41-59.

Halevi, Shai, et al., "Strengthening Digital Signatures via Randomized Hashing", Crypto '06 (short version at http://www.ee.technion.ac.il/~hugo/rhash/), Jan. 30, 2007, 27 pgs.

Halevi, Shai, et al., "The RMX Transform and Digital Signatures", IBM T.J. Watson Research Center, Hawthorne, New York 10532, Aug. 22, 2006, 16 pgs.

Kelsey, John, et al., "Second Preimages on n-Bit Hash Functions for Much Less than 2n Work", In Advances in Cryptology-EUROCRYPT 2005, LNCS 3494, R. Cramer, Ed. Lecture Notes in Computer Science, vol. 3494. Springer, (2005), 474-490.

Merkle, Ralph C., "One Way Hash Functions and DES", In Advances in Cryptology—CRYPTO 1989, G. Brassard. Lecture Notes in Computer Science, vol. 435. Springer, (1990), 428-446.

Wang, Xiaoyun, et al., "Finding Collisions in the Full SHA-1", In Advances in Cryptology—CRYPTO 2005, LNCS 3621, V. Shoup, Ed. Lecture Notes in Computer Science, vol. 3621. Springer, (2005), 17-36.

Wang, Xiaoyun, et al., "How to Break MD5 and Other Hash Functions", In Advances in Cryptology-EUROCRYPT 2005, LNCS 3494, R. Cramer, Ed. Lecture Notes in Computer Science, vol. 3494. Springer, (2005), 19-35.

* cited by examiner

GENERATION OF RANDOMIZED MESSAGES FOR CRYPTOGRAPHIC HASH FUNCTIONS

TECHNICAL FIELD

The present subject matter relates, in general, to information security and cryptography and, in particular, to generation of randomized message for use in cryptographic hash functions.

BACKGROUND

A cryptographic hash function is a mathematical function that takes an arbitrary length message and returns a fixed-size bit string, referred to as hash value or message digest, such that an accidental or intentional change to the message will, with very high probability, changes the hash value.

Cryptographic hash functions play a significant role in secure and efficient digital information processing. Therefore, the cryptographic hash functions are employed by various corporate sectors in many information processing applications, such as efficient digital signature generation and verification, message integrity, password protection, signcryption mechanism, cryptographic commitment protocols, key derivation functions (KDFs), and message authentication codes (MACs).

The cryptographic hash functions generally have three security properties, namely, collision resistance, preimage resistance, and second preimage resistance. The requirement of these properties depends on an application in which the cryptographic hash function is used. This implies, a security attack that weakens any of these properties could undermine the security of the application which needs that property. For example, a collision attack on a hash function defeats the security of the digital signatures and a preimage attack on a hash function compromises the security of applications, such as password protection and MACs. Thus, the cryptographic hash functions are designed to prevent any such attack that compromises on security of an application.

The cryptographic hash functions, such as message digest algorithm (MD5) and secure hash algorithm-1 (SHA-1) are widely used by various corporate sectors to have secure and efficient implementation of the information processing applications. However, certain cryptographic hash functions, such as MD5 and SHA-1 are susceptible to the security attacks, such as collision attacks. Further, cryptographic libraries of some licensed software frameworks may not support stronger hash functions for application security and until the time they start supporting stronger hash functions these frameworks may use susceptible hash functions for application security.

SUMMARY

This summary is provided to introduce concepts related to generation of randomized messages for use in hash functions. These concepts are further described below in the detailed description. This summary is not intended to identify essential features of the claimed subject matter nor is it intended for use in determining or limiting the scope of the claimed subject matter.

Method(s) and a system(s) for generating randomized message are described herein. In an implementation, a random value is obtained based on a randomization criterion to randomize a message. Further, a last data block of the message is populated with a randomization parameter to obtain a randomized message. The randomization parameter is computed using the random value.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
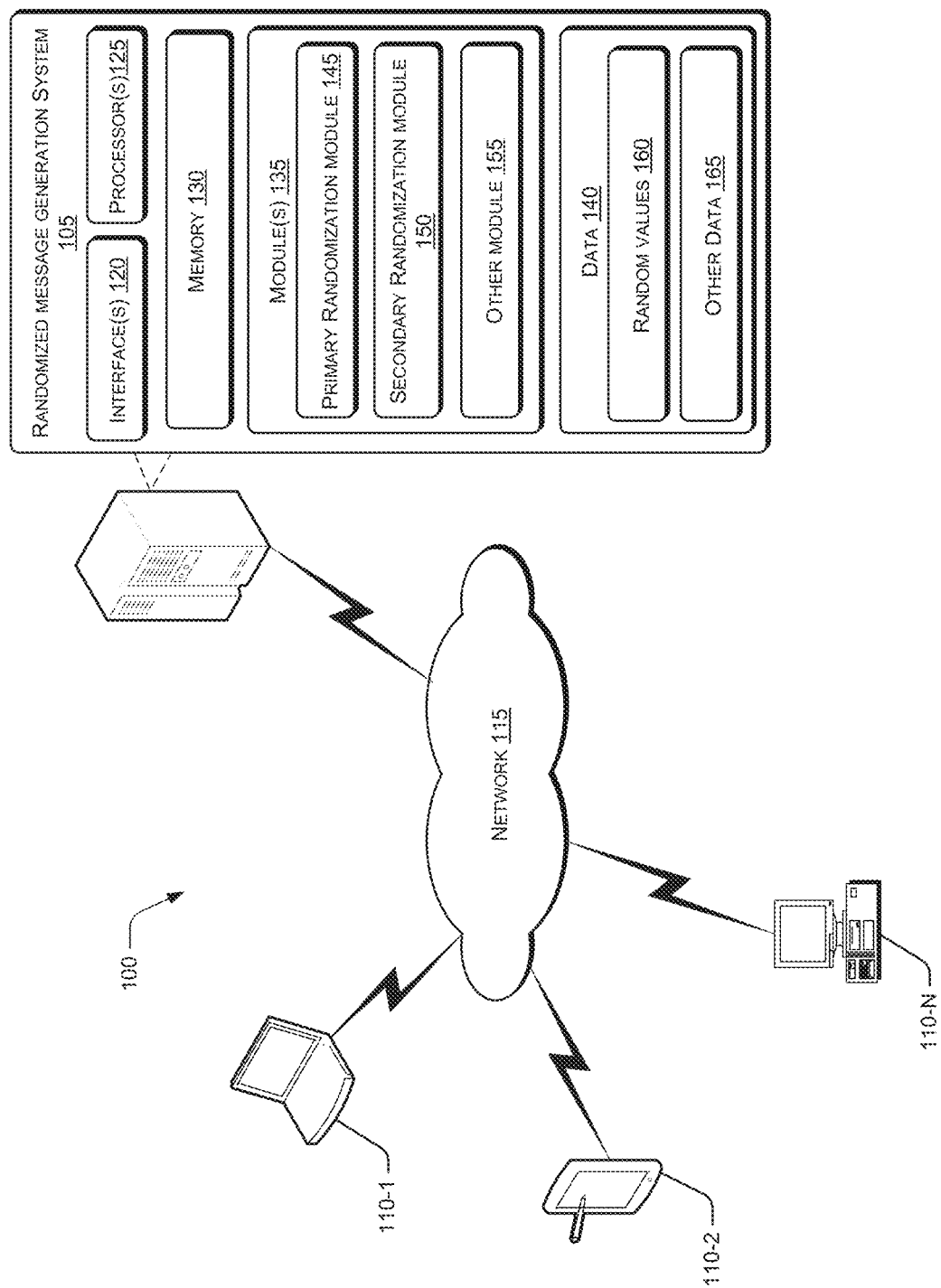
FIG. 1 illustrates a computing environment implementing a randomized message generation system, in accordance with an embodiment of the present subject matter.

Method(s) and a system(s) to generate message digests for secure information processing applications, such as digital signatures, are described herein. The systems and methods described herein can be implemented on computing devices, such as a server, a desktop, a mobile device, a notebook or a portable computer.

Generally, cryptographic hash functions, also referred to as hash functions, are employed for secure and efficient implementation of information processing applications, such as digital signature generation and verification, message integrity, password protection, signcryption mechanism, cryptographic commitment protocols, key derivation functions (KDFs), and message authentication codes (MACs). The cryptographic hash functions generally have three security properties, namely, collision resistance, preimage resistance, and second preimage resistance. A hash function, H, is considered to be collision resistant if it is not possible to find two distinct messages that hash to the same output in less than birthday complexity on the size of the message digest; that is, the hash function, H, is not collision resistant if it is possible to find two distinct messages a and b such that $H(a)=H(b)$, and $a \neq b$ in less than birthday complexity on the size of the message digest.

However, certain popular hash functions, such as message digest algorithm (MD5) and secure hash algorithm-1 (SHA-1) are not collision resistant. Therefore, such hash functions may be considered insecure for applications, for example, digital signatures that require collision resistance property. In order to provide enhanced protection for applications, such as digital signatures, against collision attacks on the cryptographic hash functions, a mode of operation that randomizes message inputs to the hash functions is employed. Such a mode of operation is referred to as randomized hash function mode. Randomized hash function modes are often employed in digital signature applications as they strengthen the security of digital signatures.

These randomized hash function modes operate such that digital signature security depends on a security property related to second preimage resistance of the hash function, which is much harder to break as compared to the collision resistance. In other words, even if an attacker finds a collision in a hash function, he would not be able to use the collision to forge signature schemes that use the randomized hash function mode to compute a message digest.

In the randomized hash function mode a common salt, which is a random value may be used for both signing and hashing to save on communication bandwidth involved in transporting a separate salt to a verifier of the signing system. Though such randomized hash functions prove to be suitable for limited bandwidth applications, at the same time, they are observed to be susceptible to security attacks, such as online forgery attacks. In the online forgery attacks, an attacker in an online setting, can forge digital signature schemes by exploiting easy to find fixed points that exist in the compression functions of popular hash functions, such as MD5, SHA-1 and SHA-256. These online forgery attacks have a computational cost of birthday complexity on the size of the hash value and therefore these attacks may also be called online birthday forgery attacks. Thus, online forgery attacks may exploit structural weakness in the underlying components of these hash functions. Further, the online forgery attacks directly apply to the usage of random value generated during every signature computation also as a salt for randomized hashing, which is recommended to save communication bandwidth, thereby showing the possibility of collision attacks in the online setting to forge digital signatures.

According to an embodiment of the present subject matter, systems and methods for generation of randomized messages are described. The randomized messages are generated for an input message, which may be, for example, a document meant for digital signing. In an implementation, the message is randomized to ensure the security and efficiency of an underlying information processing application. For randomizing the message, the message is divided into predetermined number of data blocks based on a block length of a compression function. The compression function is a component of a cryptographic hash function used for processing each message block, i.e., data block iteratively until the whole input message is processed. Further, a random value is obtained to perform the randomization of the message. The random value may be concatenated to itself a predetermined number of times based on the block size of the compression function.

The divided message is randomized based on the concatenated random value. Further, it is determined if a last data block of the message can accommodate a randomization parameter and padding bits. In case it is determined that last data block does not have sufficient space to accommodate the randomization parameter and the padding bits, an additional data block is appended at the end of the message, which now serves as the last data block. To prevent the message from online forgery attacks, the last data block is populated with the randomization parameter. The randomization parameter is computed based on the random value. For example, based on the space available in the last data block, the random value may be concatenated to itself a sufficient number of times to obtain the randomization parameter. Thus, the randomized message may include the data blocks, which are randomized using the randomization criterion and the last data block includes the randomization parameter.

Additionally, randomness by way of a random factor may also be appended at the beginning of the message. The random factor may be based on the random value and a block length of the compression function. In said case, in addition to randomized data blocks and the randomization parameter in the last data block, the randomized message also includes the random factor as the first data block.

The described modes of the randomized hashing provide resistance against various security attacks, such as collision attacks, forgery attacks on the digital signatures due to collision attacks on the hash functions, fixed point based online forgery attacks on the digital signatures in birthday complexity and generic online forgery attacks in birthday complexity for the scenarios where the random value used for signing is also used for randomized hashing. Since it may not be possible for an attacker to predict with a high probability the salt or the random value to be used by a signer to sign randomized hash of one of the colliding messages, the attacker cannot find collisions for these randomized hash function modes before signature computation. Therefore, offline forgery attacks on the digital signatures are not applicable as an attacker can not make use of an offline collision to query the signer on one of the colliding messages and show this signature as the one for the other colliding message.

Further, since the random value always exists in the last block, an attacker who finds precomputed fixed points must be able to fix the fresh random value to be used by the signer in every signature computation. However, this might not be possible for the attacker for two reasons. Firstly, an attacker should be able to predict the random value to be used by the signer for signing each message query request of the attacker. As mentioned earlier, it is not possible for the attacker to predict the random value with a high probability and thus the attacker may not carry out an online forgery attack. Secondly, the signer uses fresh random value in every signature computation and therefore, the random value in the colliding fixed point block must be exactly the same as the one used by the signer for that particular collision. To summarize, the attacker may have no control over the random value in the fixed point block although he can control the padding bits by fixing them before the attack and the message bits in the fixed point by xoring them with the random value. Thus, an attacker can not execute fixed point based online forgery attack in birthday complexity. Additionally, in cases where the fresh random value used in every signature generation is also used for randomized hashing, the generic online forgery attacks may be prevented in birthday complexity.

The above systems and methods are further described in conjunction with the following. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and embodiments of the present subject matter, as well as specific examples thereof, are intended to encompass equivalents thereof.

FIG. 1 illustrates a computing environment 100 implementing a randomized message generation (RMG) system 105, according to an embodiment of the present subject matter. The RMG system 105 may be coupled to a plurality of computing devices 110-1, 110-2, . . . 110-N via a network 115. The computing devices 110-1, 110-2, . . . 110-N may be referred to as the computing device(s) 110. The network 115 may be a wireless network, wired network or a combination thereof. The network 115 can be implemented as one of the different types of networks, such as intranet, local area network (LAN), wide area network (WAN), the internet, and such. The network 115 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

The RMG system 105 and the computing devices 110 can be implemented using devices that include, but are not limited to, desktop computers, hand-held devices, such as mobile phones, smart phones, touch phones tablets and the like, multiprocessor systems, personal digital assistants (PDAs), laptops, network computers, cloud servers, mini-computers, mainframe computers, and the like.

For the purpose of explanation, and not as a limitation, the foregoing description is with reference to implementation of hash functions in digital signature applications. It will be understood that the described systems and methods may be implemented for other information processing applications as well. Further, the computing environment 100 may be understood as a digital signature environment, where the RMG system 105 may be understood as a computing system corresponding to a signer who is to digitally sign a document, which is verified by one of the computing devices 110. Thus, the RMG system 105 may be understood as a signing entity, while the computing devices may be understood as the verifying entity. Additionally, it will be appreciated that the RMG system 105 may be a signing entity in one case and a verifying in other.

Further, for the sake of clarity, certain notations used herein are explained in this paragraph. If a and b are any two bit strings then $a\|b$ is the concatenation of a and b. For example, if a=0001 and b=011 then $a\|b=0001\|011=0001011$. Further, for any bit string a, $|a|$ denotes the size of a in bits. For example, let a=10001011 then $|a|=8$ bits. For any bit string a and a positive integer N, $a^N$ represents the concatenation of a to itself for N times. For example, $0^{300}$ is the concatenation of bit 0 to itself for 300 times. For any bit string a, $a^{[t]}$ denotes the first t most significant bits of a.

In an implementation, the RMG system 105 includes interface(s) 120 and one or more processor(s) 125. The interfaces 120 may include a variety of software and hardware interfaces, for example, interfaces for peripheral device(s), such as a keyboard, a mouse, a camera, a microphone, touch pad, and stylus. Further, the interfaces 120 may enable the RMG system 105, to communicate with other computing systems, such as web servers and external databases. The interfaces 120 can facilitate multiple communications within a wide variety of networks, and protocol types, including wired networks, for example, local area network (LAN), cable, etc., and wireless networks, such as Wireless LAN (WLAN), cellular, or satellite. For the purpose, the interfaces 120 may include one or more ports for connecting a number of computing systems to each other or to another server computer.

The processor 125 may be implemented as one or more microprocessors, microcomputers, microcontrollers, digital signal processors, central processing units, state machines, logic circuitries, and/or any devices that manipulate signals based on operational instructions. Among other capabilities, the processor 125 fetches and executes computer-readable instructions stored in a memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In another embodiment, the RMG system 105 may include a memory 130. The memory 130 may be communicatively coupled to the processor 125. The memory 130 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the RMG system 105 may include module(s) 135 and data 140. The modules 135 and the data 140 may be coupled to the processor 125. The modules 135, amongst other things, include routines, programs, objects, components, data structures, etc., which perform particular tasks or implement particular abstract data types. The modules 135 may also be implemented as, signal processor(s), state machine(s), logic circuitries, and/or any other device or component that manipulate signals based on operational instructions.

Further, the modules 135 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 135 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

Further, the data 140 serves, amongst other things, as a repository for storing data processed, received, and generated by one or more of the modules 135. The modules 135 further include, for example, a primary randomization module 145, a secondary randomization module 150, and other module(s) 155. The other modules 155 may include programs that supplement applications on the RMG system 105, for example, programs in the operating system. It will be understood that the certain modules may be provided on separate devices, which in combination may form the RMG system 105. The data 140 includes, for example, random values 160 and other data 165. The other data 165 may include data generated as a result of the execution of one or more modules in the other modules 155.

Consider that the RMG system 105 is corresponding to a signer, who is to digitally sign a document and provide to a verifying entity, say, computing device 110, which verifies the digital signature for authenticity. To ensure security and efficient application of the digital signature the RMG system 105 may employ a cryptographic hashing function, such as SHA-1. Further, the RMG system 105 may receive the document to be signed, or in other words a message, and generate a corresponding randomized message. The RMG system 105 may employ a cryptographic hash function such that the cryptographic hash function and its compression function are not vulnerable to attacks, such as short-cut second preimage attacks and related attacks that contradict second preimage resistance of the compression function or hash function and any property related to the second preimage resistance of the compression function and hash function. In an example, the digital signature may be generated using a standard digital signature algorithm, such as DSA or ECDSA. The cryptographic hash function may have a framework based on Merkle-Damgård construction. Further, the cryptographic hash functions may include a compression function, for example, a compression function based on Davies-Meyer construction, such as SHA-1, which is a single block length block cipher based compression function. Upon receiving a message to be hashed, the primary randomization module 145 may obtain a random value, also referred to as salt, prior to computation of the message digest and generation of the corresponding digital signature. The obtained random value may be stored in the random values 160. In an example, the random value has a bit size of at least 128 bits and at most equivalent to a block length of the compression function. The random value may be generated based on a randomization criterion. In an implementation, the randomization criterion may be to reuse the random value generated as part of the signature process for message randomization purpose. In such a case there is no need to generate a new random value for message randomization and communicate to the verifying entity. Further, the same random value may also be used by digital signature schemes, such as digital signature algorithms (DSA) and Elliptic Curve Digital Signature Algorithm (ECDSA) as part of the signature. In an example, the primary randomization module 145 implements a random number generator of DSA or ECDSA to generate a secret random number, which is protected from unauthorized disclosure and modification. It will be understood that for each message a separate secret random number may be generated. For example, the random number may be derived from the secret random number using a procedure outlined as part of the DSA signature generation. In said example, a random value r is computed from a per-message secret random number k by using the expression $r=g^k$ mod q where mod is a modulus operator and q is a prime divisor of p−1 such that $2^{N-1}<q<2^N$ where N is the bit length of q and p is a prime modulus such that $2^{L-1}<p<2^L$. The standard choices of L and N are provided in Section 4.2 of DSS FIPS 186-3. This random value r may also be used for randomized hashing and it is also part of the signature to be sent to the verifier. Although generation of the random value r has been explained in detail with respect to DSA, it will be understood that other techniques and procedures may also be used, for example, procedures based on ECDSA.

In another implementation, in case the signature scheme employed by the signing entity does not generate the random value, the randomization criterion may specify that the random value is to be generated. In this scenario, the primary randomization module 145 may include a random bit generator, for example, random bit generators as specified in NIST's Special Publication (SP) 800-90 standard. In said implementation, the random value may be communicated to the verifying entity along with the digital signature.

Upon obtaining the random value, the primary randomization module 145 may concatenate the random value to itself a predetermined number of times, based on the block length of the compression function being employed by the cryptographic hash function to obtain a concatenated random value, which may also be stored in the random values 160. The random value may be concatenated to itself such that the bit size of the concatenated random value is equivalent to the block length of the compression function. For example, a 128-bit random value is concatenated to itself four times to obtain a 512-bit random value which is the block length of the compression functions of hash functions SHA-1 and SHA-256. Further, the primary randomization module 145 may divide the message into a predetermined number of data blocks based on the block size of the compression function. The predetermined number of data blocks may be computed such that a bit size of each of the data blocks is equivalent to the block length of the compression function. In an example, the last block of the message may contain fewer bits than the block length of the compression function.

Further, once the message is divided in to the predetermined number of data blocks, the secondary randomization module 150 may randomize each of the data blocks based on the concatenated random value. In an example, each of the data blocks may be mixed with concatenated random value using a mixing function. This ensures that every bit of the message is randomized. For instance, an exclusive-or (XOR) operation may be the mixing function and XOR operation may be performed between each of the data blocks and the concatenated random value. For example, if a message, M, contains three data blocks, where $M=M_1\|M_2\|M_3$ and each block is of 512 bits. Further, consider a random value r, where |r|=128 bits, then concatenated random value will be $r^4$, which will be the concatenation of r for four times so that $|r^4|$ is 512 bits, then the message may be randomized using the randomization criterion, which may represented as:

$$(M_1 \text{ xor } r^4)\|(M_2 \text{ xor } r^4)\|(M_3 \text{ xor } r^4).$$

Though XOR operation has been used in the present example, it will be understood that any mixing function that provides for sufficient randomization to ensure security without complicating the process and compromising the efficiency may be used.

Further, upon randomizing each of the data blocks, the secondary randomization module 150 determines whether a current last block of the message has enough space to accommodate a randomization parameter to obtain a randomized message and the padding bits required by the hash function. The randomization parameter is based on the random value and provides for randomization of the last data block. In an implementation, the padding bits include a bit 1 followed by bits that represent an original length of the message in the binary encoded format. The bit size of this binary encoded format depends on the hash function being used. For example, if the hash function is SHA-1, then the size of the original message is represented in a 64-bit encoded format. For instance, if the original message is abc which is 24 bits in length then the number 24 is represented in the 64-bit binary encoded format as 000 . . . 0011000 which is a 64-bit representation of abc.

Further, the secondary randomization module 150 may determine a bit size of the random value. For example, the secondary randomization module 150 may determine the bit size of the random value such that the minimum value is 128 bits and maximum value is of the block size of the compression function. The secondary randomization module 150 may compute a sum total of the bit size of the random value and the minimum bit size of the padding bits to determine if the available space in the current data block can accommodate the padding bits and the random value. If the sum total is greater than the available space, an additional data block may be appended to the end of the message. It will be understood that the appended data block serves as the last data block of the message and may contain the repetitions of the random value r until the starting position of the padding bits. Further, this repetitive random value may provide randomization parameter. To determine the randomization parameter, the secondary randomization module 150 may determine a number of bits available after adding the padding bits to the last data block. In an example, the last block includes the random value until a position from where the padding bits start. Thus, based on the number of bits available after considering the padding bits, the random value may be concatenated to itself. In case the number of bits is just enough to accommodate the random value, the random value may not be concatenated to itself and the random value itself serves as the randomization parameter. In another case, where the random value is to be concatenated, the concatenated random value serves as the randomization parameter.

Further, if the sum total of the bit size of the random value and the bit size of the padding bits is less than or equal to the available space, no additional data block may be appended. In such a case, the last data block may include message bits already present in the last data block mixed with the random value using the mixing function and the randomization parameter that may include repetition of the random value to a necessary length. In addition the last block includes the padding bits.

Referring to the example mentioned above, considering that an additional data block is added and 512 bits are available. As computed above, the bit size of the padding bits is 65 bits. In said example, 447 bits may be used for the randomization parameter and 65 bits may be used for padding bits. Thus, the random value may be concatenated to itself to obtain the randomization parameter, which is 447 bits long. Further, the previous block, i.e., the second last data block, which may contain fewer than 512 bits of the message mixed with the random value, may also contain randomization parameter whose size depends on the number of message bits available. Additionally, the size of the randomization parameter would be less than the sum of |r| and minimum size of the padding bits.

Additionally, the secondary randomization module 150 may further prepend a data block, which serves as the first data block for the randomized message. The first data block includes a random factor, which is computed based on the random value and a block length of the compression function. In an example, the first data block may include the random value concatenated to itself the predetermined number of times based on the block length of the compression function. For instance, the random value is concatenated to itself the predetermined number of times such that the bit size of the concatenated random value is equivalent to the block length of the compression function. In said example, this concatenated random value may serve as the random factor. In another example, in the first block instead of repeating the random value to fill in the block, a predetermined number of zeros may be appended to the random value to make a first block. It will be understood that the predetermined number of zeroes may be determined based on the block length of the compression function and the bit size of the random value. The predetermined number of zeroes may be determined based on the available space in the first data block after considering the random value. In said example, the random value having predetermined number of zeroes appended to it may be taken as the random factor.

In an implementation, the secondary randomization module 150 may hash the randomized message to obtain the message digest. Further, using the message digest, the digital signature may be obtained by applying a signature technique used for generating the digital signatures, such as the standard DSA algorithm. The digital signature, the message, and the random value, which may be part of the digital signature itself, may be transmitted to the verifying entity, such as the computing device 110. The computing device 110 may in turn verify the digital signature by using a verifying algorithm.

Thus, the randomization mode where the randomization is suffixed to the message and subsequent hashing described above may be illustrated as:

$$SRMX(r,M)=((M_1 \oplus r) \| \ldots \| (M_L \oplus r) \| r)$$

$$H(SRMX(r,M))=H((M_1 \oplus r) \| \ldots \| (M_L \oplus r) \| r)$$

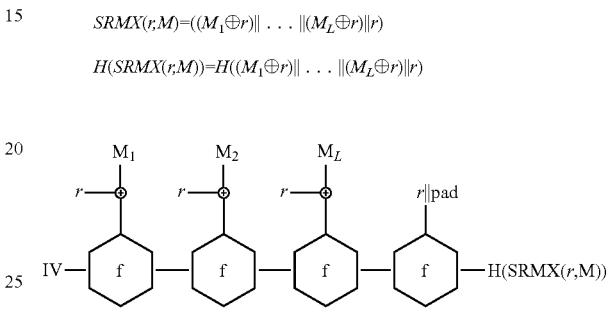

where H (SRMX(r, M)) is the randomized hash function mode, r is the random value, $M_1 \ldots M_L$ are the individual data blocks of the message M according to the block size of the compression function $f$ of the cryptographic hash function H, $\|$ is the concatenation operator, and $\oplus$ is the linear XOR mixing function, and pad denotes padding bits.

In the above illustration it is assumed that a length of the message M is an integral multiple of the block length of the compression function $f$ and hence message M can be split into the blocks $M_1, M_2 \ldots M_L$ of equal length. In one example, the last data block $M_{L+1}$ includes the randomization parameter and padding bits. For instance, if $|M_L|=512$ bits then $M_L$ is xored with $r_{512}$ and $M_{L+1}=r_{512}^{[319]} \|$ padding bits. In an alternate illustration (not shown), the last data block may also include the message bits that were part of the message. For instance, if $|M_L| \leq 319$ bits then $M_L$ is xored with concatenated random value and this xored value is appended with the randomization parameter, which may include random value, r, concatenated to itself for sufficient number of times followed by the appending of 65-bit padding. Thus, in said example there may be no need to append an extra data block $M_{L+1}$ and $M_L$ serves as the last data block.

Considering the case, where the randomness is not only suffixed, but also prefixed, the randomness mode of the cryptographic hash function may be illustrated as:

$$PSRMX(r,M)=(r \| (M_1 \oplus r) \| \ldots \| (M_L \oplus r) \| r)$$

$$H(PSRMX(r,M))=H(r \| (M_1 \oplus r) \| \ldots \| (M_L \oplus r) \| r)$$

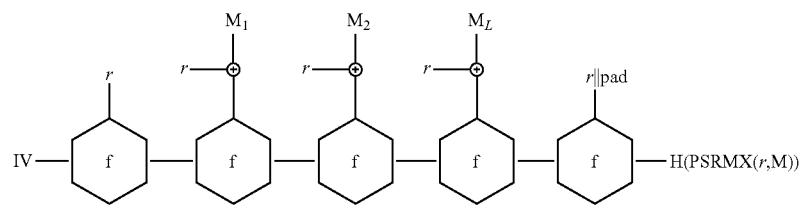

where H (PSRMX(r, M)) is the randomized hash function mode where randomness is both suffixed and prefixed, r is the random value, $M_1 \ldots M_L$ are the individual data blocks of the message M according to the block size of the compression function $f$ of the cryptographic hash function H, $\|$ is the concatenation operator, and $\oplus$ is the linear XOR mixing function, and pad denotes padding bits.

Thus, the present subject matter describes randomization hash function modes that provide enhanced security in the information processing applications, such as digital signatures. Further, according to the present subject matter, the randomness may be appended towards the end of the message, in addition to randomness applied to the rest of the message blocks. Additionally, the randomness may not only be suffixed, but may also be prefixed to the message. The addition of randomness at the end of the message in both these modes prevents online birthday forgery attacks that exploit fixed points in the compression functions of SHA family of hash functions. Since, the random value is chosen by the signing entity and is freshly generated for each digital signature, the attacker can not predict the random value. That is, although an attacker can find birthday number of fixed points and do a collision matching with the randomized hash values, after they are signed and the corresponding digital signatures are sent to the attacker, the attacker cannot use the random value for which online birthday collision took place in the last data block as that would change the precomputed fixed point block for which collision occurred.

Also, the generic online forgery attacks may be prevented for the applications where the random value generated for signing is also used for randomized hashing because the signature verification algorithm fails if a different random value is used during verification compared to the one used by the signer. For this usage, an attacker must contradict Target Collision Resistance (TCR) property of the hash function, where the attacker first chooses a message M and then he is given a random value r. Subsequently, the task of the attacker is to find N such that H(PSRMX(r,M))=H(PSRMX(r,N)) or H(SRMX(r,M))=H(SRMX(r,N)). However, by using online queries it is not possible for an attacker to break this property in birthday complexity for the described randomization modes, H(PSRMX(r,M)) or H(SRMX(r,M)), even if the compression function has fixed points. Therefore, the attacker has to break the second preimage resistance property of the hash function or compression function or a related property in order to break the TCR property of the proposed randomized hash function modes.

However, generic attacks on the proposed randomized hash functions can be performed in birthday complexity to compromise the enhanced Target Collision Resistance (e-TCR) property where the attacker first chooses a message M and then he is given a random value r. Subsequently, the task of the attacker is to find the pair (r', N) such that H(PSRMX(r,M))=H(PSRMX(r',N)) or H(SRMX(r,M))=H(SRMX(r',N)), where (r,M) is not equal to (r',N). Nevertheless, contradicting this property in birthday complexity does not help the attacker to forge digital signatures, where the same salt is used for both hashing and signing, which is the main application for which protection is sought against birthday online forgery attacks as well as forgery attacks due to offline collisions in the hash functions. If a particular signature scheme has no option of using the random value generated by the signature scheme also for the hashing, the random value has to be generated explicitly for the hashing purpose. Further, the generated random value may need not be signed along with the hash value for both randomization hash function modes, SRMX and PSRMX. The reason is that attempts to interchange the roles of data block and random value to break an e-TCR property for SRMX hash function mode in order to forge signatures based on it are thwarted by the suffix random value. For example, for a hash function H based on a second preimage resistant compression function or a compression function with security properties closely related to second preimage resistance, $H((M_1 \oplus r) \| r))$ is not identical to $H((M'_1 \oplus r') \| r'))$ for a significant probability where $M_1$ is a message block, r is a random value, $r'=M_1$ and $M'_1=r$. On the other hand, if there is no suffix random value, the expression $H(M_1 \oplus r)=H(M'_1 \oplus r')$ always holds even when the compression function is second preimage resistant or has a property closely related to second preimage resistance. Similarly, the suffix random value may prevent other techniques that could be employed to violate e-TCR property of SRMX hash function mode for a complexity less than generic complexity. Since PSRMX hash function mode has both the prefix and suffix random values, such attacks do not apply to this hash function mode.

Therefore, when these randomization methods are used no changes to the standard hash functions and digital signature schemes may be required. Furthermore, the randomization mode having randomness appended at the end as well as the beginning, i.e., PSRMX may offer better resistance against short-cut attacks that aim to break TCR and e-TCR properties. This may be because an attacker has to exercise control not only over the randomized message mixing and randomized suffix parts but also prefix part in case of PSRMX. In addition, the generic second preimage attacks that make use of expandable messages requiring far higher than birthday complexity are applicable on the presented randomized hash function modes.

Further, corporate sectors that use cryptographic libraries of software frameworks that do not support stronger hash functions, may employ the described mode of randomized hash functions until migration to stronger hash functions, such as SHA-256, SHA-512 or SHA-3, takes place. Further, the described mode of randomized hashing may also be integrated with the stronger hash functions providing stronger security for digital signature applications.

Figure 2:
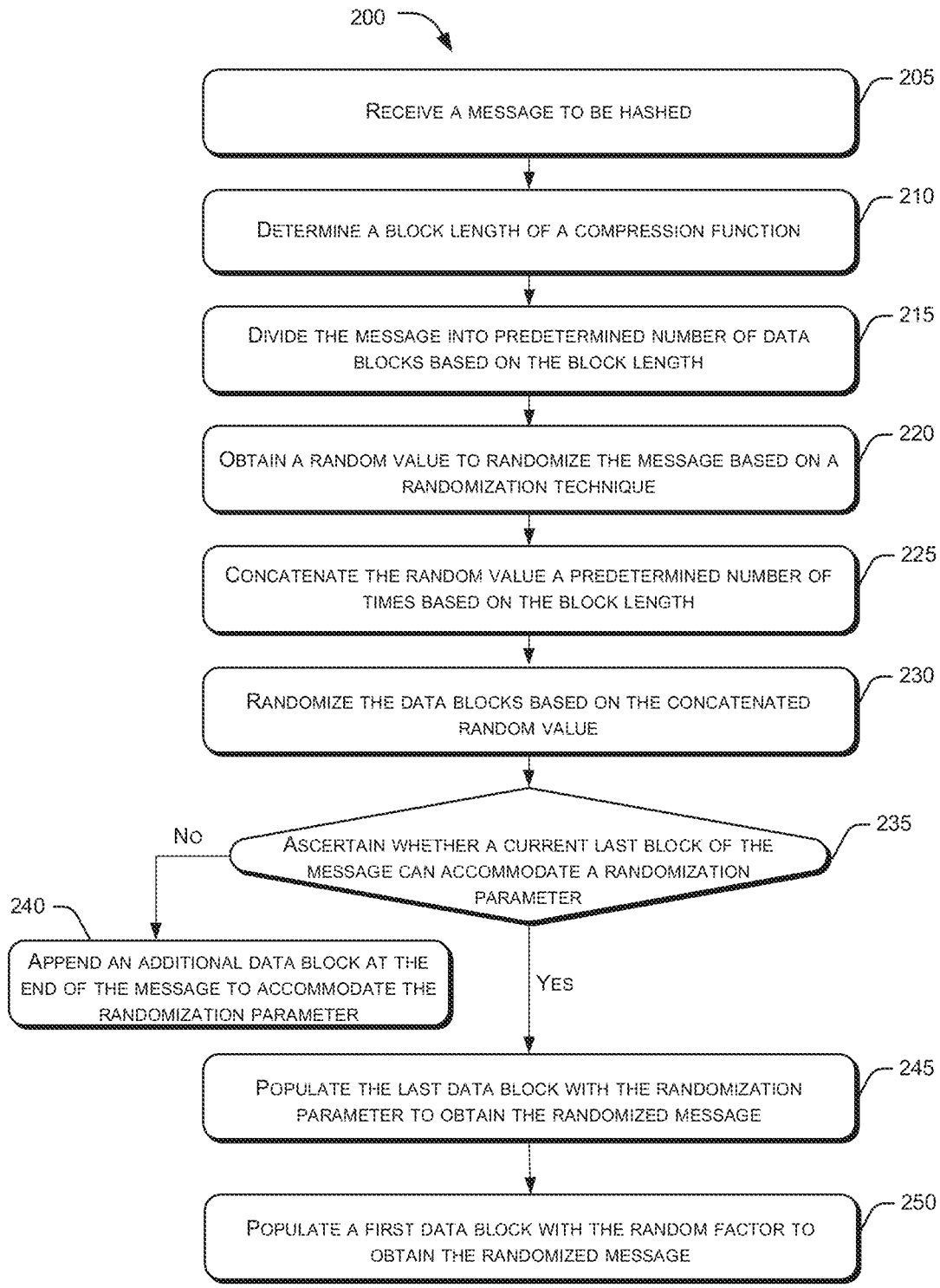
FIG. 2 illustrates a method for generating randomized messages, in accordance with an implementation of the present subject matter

FIG. 2 illustrates a method 200 for generating randomized messages used for obtaining a message digest, in accordance with an implementation of the present subject matter.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the methods without departing from the spirit and scope of the subject matter described herein. Furthermore, the method can be implemented in any suitable hardware, software, firmware, or combination thereof.

At block 205, a message to be hashed using a hash function employed by a computing system, such as the random message generation system, may be received. For example, the message may be a document to by digitally signed by a signer associated with the computing system.

At block 210, a block length of a compression function of the hash function may be determined. For example, the primary randomization module 145 may determine the block length of the compression function.

At block 215, the message is divided into a predetermined number of data blocks based on the block length of the compression function. The predetermined number of data blocks may be computed such that a bit size of each of the data blocks is equivalent to the block length of the compression function. For example, the primary randomization module 145 may divide the message into the predetermined number of data blocks.

At block 220, a random value for randomizing the message may be obtained based on a randomization criterion. The randomization criterion may define whether random value generated for a signature algorithm can be used or a different one is to be generated. For example, the primary randomization module 145 may obtain the random value based on the randomization criterion.

At block 225, the random value is concatenated to itself a predetermined number of times based on the block length of the compression function. In an example, the random value may be concatenated to itself such that the bit size of the concatenated random value is equivalent to the block length of the compression function. In an implementation, the primary randomization module 145 may concatenate the random value the predetermined number of times to obtain the concatenated random value.

At block 230, each of the predetermined number of data blocks of the message is randomized using the concatenated random value. For example, a mixing function may be used to mix the bits in the data blocks with the concatenated random value for randomizing the message. In an implementation, the secondary randomization module 150 may randomize the data blocks using the concatenated random value.

At block 235, it is ascertained whether a current last data block of the message can accommodate a randomization parameter. Additionally, it may be determined whether the last data block can accommodate padding bits. The randomization parameter may be computed using the random value. Based on the space available in the last block, the randomization parameter may be the random value itself or may include the random value concatenated to itself a predetermined number of times. The padding bits may include a bit 1 followed by bits that represent an original length of the message in the binary encoded format. In an implementation, the secondary randomization module 150 may ascertain whether the current last data block of the message can accommodate a randomization parameter. If it is determined that the current last data block of the message can not accommodate the randomization parameter, the method 200 proceeds to ('No branch') block 240.

At block 240, an additional data block is appended at the end of the message, which now serves as the last data block of the message. The additional data block has a bit size equivalent to the block length of the compression function. In an implementation, the secondary randomization module 150 may append the additional data block to the message.

If at block 235, it is determined that the current last block can accommodate the randomization parameter, the method 200 proceeds to ('Yes' branch) block 245. At block 245, the randomization parameter is populated in the last block of the message to obtain the randomized message. It will be understood that in cases where no additional data block is appended, the current last block is the data block to which the randomization parameter is populated; and the cases where the additional data block is appended, the randomization parameter is populated in the newly added data block.

In an implementation, in addition to appending randomness in the last data block, another data block may be prepended at the beginning of the message to obtain the randomized message. At block 250, a first data block may be populated with a random factor to obtain the randomized message. The random factor is computed based on the random value obtained at block 220 and the block length of the compression function obtained at block 210. For instance, random factor may be the concatenated random value determined at block 225. In another example, the random factor may include a predetermined number of zeroes appended to the random value. In an implementation, the secondary randomization module 150 may append this new data block as the first block of the message.

Further, the randomized message may be used as an input by the hash function provide a message digest, which in turn may serve as input for a digital signature algorithm such as DSA.

Although embodiments for generation of randomized messages have been described in a language specific to the structural features and/or methods, it is understood that the invention is not necessarily limited to the specific features or methods described. Rather, the specific features and methods are disclosed as exemplary embodiments for generation of randomized messages.

I claim:

1. A randomized message generation system comprising:
at least one hardware processor;
a primary randomization hardware module coupled to the hardware processor, the primary randomization module:
generates a randomized message for an input message and divides the input message into a predetermined number of data blocks based on a block length of a compression function, wherein a bit size of each of the predetermined number of data blocks is equivalent to the block length of the compression function, wherein the compression function is a component of the cryptographic hash function used for processing each message block iteratively until the whole input message is processed; and
obtains a random value based on a randomization criterion to randomize a message wherein the random value is concatenated to itself a predetermined number of times based on the block length; and
a secondary randomization hardware module coupled to the hardware processor to:
randomize each of a predetermined number of data blocks in the message based on the concatenated random value, obtained by the primary randomization module, using a mixing function to obtain randomized data blocks;
determine, space availability in a last block of the input message to accommodate the randomization parameter and padding bits by comparing a sum total of the bit size of the random value and minimum bit size of the padding bits with the space availability in the last block wherein in case of a sum total exceeding the space available, an additional data block is appended at the end of the input message; and populate one of a last randomized data block, the appended additional data block at the end of the input message, and a data block appended at the beginning of the message in the randomized data blocks of the message with a randomization parameter and a random factor, respectively, to obtain a randomized message for use in a cryptographic hash function, wherein the randomization parameter is computed using the random value.

2. The randomized message generation system as claimed in claim 1, wherein the secondary randomization module further determines:
   space occupied by padding bits in the last data block;
   available space in the last data block based on the space occupied by the padding bits and message bits in the last data block to compute the randomization parameter.

3. The randomized message generation system as claimed in claim 1, wherein the secondary randomization module randomizes each of the predetermined number of data blocks using the concatenated random value, wherein the concatenated random value is mixed with a data block using the mixing function and wherein the mixing function is an exclusive-or operation.

4. The randomized message generation system as claimed in claim 1, wherein the random factor is based on the random value and a block length of a compression function.

5. A computer implemented method for generating randomized messages for cryptographic hash functions, the method comprising:
   generating, by a hardware processor, a randomized message for an input message and dividing the input message into a predetermined number of data blocks based on a block length of a compression function wherein a bit size of each of the predetermined number of data blocks is equivalent to the block length of the compression function, wherein the compression function is a component of the cryptographic hash function used for processing each message block iteratively until the whole input message is processed;
   obtaining, by the hardware processor, a random value based on a randomization criterion to randomize a message wherein the random value is concatenated to itself a predetermined number of times based on the block length;
   randomizing, by the hardware processor, each of a predetermined number of data blocks in the message based on the concatenated random value using a mixing function to obtain randomized data blocks;
   determining, by the hardware processor, space availability in a last block of the input message for accommodating the randomization parameter and padding bits by comparing a sum total of the bit size of the random value and a minimum bit size of the padding bits with the space availability in the last block wherein in case of sum total exceeding the space availability, an additional data block is appended at the end of the input message; and
   populating, by the hardware processor, one of a last randomized data block and the appended additional data block at the end of the input message and a data block appended at the beginning of the message in the randomized data blocks of the message with a randomization parameter and a random factor, respectively, to obtain a randomized message, wherein the randomization parameter is computed using the random value.

6. The method for generating randomized messages as claimed in claim 5, wherein the last data block further includes padding bits.

7. A non-transitory computer-readable medium having embodied thereon a computer program for executing a method for authenticating a user, the method comprising:
   generating, by a hardware processor, a randomized message for an input message and dividing the input message into a predetermined number of data blocks based on a block length of a compression function, wherein a bit size of each of the predetermined number of data blocks is equivalent to the block length of the compression function, wherein the compression function is a component of the cryptographic hash function used for processing each message block iteratively until the whole input message is processed;
   obtaining, by the hardware processor, a random value based on a randomization criterion to randomize a message, wherein the random value is concatenated to itself a predetermined number of times based on the block length;
   randomizing, by the hardware processor, each of a predetermined number of data blocks in the message based on the concatenated random value using a mixing function to obtain randomized data blocks;
   determining, by the hardware processor, space availability in a last block of the input message for accommodating the randomization parameter and padding bits by comparing a sum total of the bit size of the random value and minimum bit size of the padding bits with the space availability in the last block wherein in case of sum total exceeding the space availability, an additional data block is appended at the end of the input message; and
   populating, by the hardware processor, one of a last randomized data block, the appended additional data block at the end of the input message, and a data block appended at the beginning of the message in the randomized data blocks of the message with a randomization parameter and a random factor, respectively, to obtain a randomized message, wherein the randomization parameter is computed using the random value.

8. The method for generating randomized messages as claimed in claim 5, wherein the method further comprises:
   determining, by the processor, space occupied by padding bits in the last data block; and
   determining, by the processor, available space in the last data block based on the space occupied by the padding bits and message bits in the last data block to compute the randomization parameter.

9. A non-transitory computer-readable medium having embodied thereon a computer program for executing a method for authenticating a user, the method comprising:
   generating, by a hardware processor, a randomized message for an input message and dividing the input message into a predetermined number of data blocks based on a block length of a compression function, wherein a bit size of each of the predetermined number of data blocks is equivalent to the block length of the compression function, wherein the compression function is a component of the cryptographic hash function used for processing each message block iteratively until the whole input message is processed;
   obtaining, by the processor, a random value based on a randomization criterion to randomize a message, wherein the random value is concatenated to itself a predetermined number of times based on the block length;

randomizing, by the processor, each of a predetermined number of data blocks in the message based on the concatenated random value using a mixing function to obtain randomized data blocks;

determining, by the processor, space availability in a last block of the input message for accommodating the randomization parameter and padding bits by comparing a sum total of the bit size of the random value and minimum bit size of the padding bits with the space availability in the last block wherein in case of sum total exceeding the space availability, an additional data block is appended at the end of the input message; and populating, by the processor, one of a last randomized data block, the appended additional data block at the end of the input message, and a data block appended at the beginning of the message in the randomized data blocks of the message with a randomization parameter and a random factor, respectively, to obtain a randomized message, wherein the randomization parameter is computed using the random value.

10. The non-transitory computer-readable medium as claimed in claim 9, wherein the random factor is based on the random value and a block length of a compression function.

* * * * *